United States Patent [19]
Burnett

[11] Patent Number: 5,644,751
[45] Date of Patent: Jul. 1, 1997

[54] DISTRIBUTED FILE SYSTEM (DFS) CACHE MANAGEMENT BASED ON FILE ACCESS CHARACTERISTICS

[75] Inventor: Rodney Carlton Burnett, Austin, Tex.

[73] Assignee: International Business Machines Corporation, Austin, Tex.

[21] Appl. No.: 317,981

[22] Filed: Oct. 3, 1994

[51] Int. Cl.$^6$ .................................................. G06F 12/08
[52] U.S. Cl. .......................... 395/440; 395/460; 395/463; 395/487
[58] Field of Search .................................. 395/460, 461, 395/462, 486, 440, 463, 487

[56] References Cited

U.S. PATENT DOCUMENTS

| | | | |
|---|---|---|---|
| 5,113,519 | 5/1992 | Johnson et al. | 395/600 |
| 5,202,971 | 4/1993 | Henson et al. | 395/600 |
| 5,297,265 | 3/1994 | Frank et al. | 395/412 |
| 5,390,318 | 2/1995 | Ramakrishnan et al. | 395/485 |
| 5,544,343 | 8/1996 | Swenson et al. | 395/460 |

FOREIGN PATENT DOCUMENTS

0463874A2  2/1992  European Pat. Off. .

OTHER PUBLICATIONS

IBM Technical Disclosure Bulletin, vol. 19 No. 12, May 1977, Biased Partitioned LRU Cache Replacement Control, p. 4697.

IBM Technical Disclosure Bulletin vol. 21 No. 10, Mar. 1979, Frequently Used Data Flush Avoidance In Cache Backing Store, p. 4199.

IBM Technical Disclosure Bulletin, vol. 36, No. 03 Mar. 1993, Local Cache for Server Files, p. 541.

Design of a File Server Operating System, Yo–Te Yeh, Lih–Fang Lin, and Yen–Jen Oyang, IEEE Tencon '93/Bejing, pp. 157–160.

*Primary Examiner*—Eddie P. Chan
*Assistant Examiner*—Kevin L. Ellis
*Attorney, Agent, or Firm*—David H. Judson; Jeffrey S. LaBaw

[57] ABSTRACT

One or more cache management technique(s) are implemented in a distributed file system of a computer network to enforce equitable use of the cache among the file data in the cache. One technique is a timestamp handicapping routine that functions to keep small-to-medium files in the cache. Another technique implements a "cache quota", which limits the percentage of the cache a single file may consume when there is other data in the cache. When caching of a single file approaches the cache quota, the file data is made to look older than it really is so that upon a subsequent file I/O operation, portions of such data are recycled from the cache earlier than they would have been otherwise. When caching of a single file reaches the cache quota, the file must begin reusing cache from itself or from handicapped chunks from other files. The cache quota technique has the effect of causing cached data towards the end of large files to get flushed or recycled from the cache first. A third technique helps to detect file I/O that is not conducive to caching, such as sequential I/O on a file that is larger that the entire cache. A cache policy prevents the large file from stealing cache space by establishing a small, but dedicated area of cache in which portions of such large file may be stored and recycled without requiring a least recently used (LRU) evaluation process.

12 Claims, 3 Drawing Sheets

LEGEND:
  FLEN:   FILE LENGTH
  Q:      PER FILE CACHE QUOTA
  SEQ IO: FILE IO IS SEQUENTIAL

DISTRIBUTED FILE SYSTEM (DFS) CACHE MANAGEMENT BASED ON FILE ACCESS CHARACTERISTICS

TECHNICAL FIELD

The present invention relates generally to distributed file systems in computer networks and more particularly to techniques that encourage equitable use of client cache resources.

BACKGROUND OF THE INVENTION

Accessing files across a distributed computer network environment presents several competing problems. One problem involves the time and resources required to transmit data across the network for successive reads and writes. The problem can be minimized by storing data in the client node to reduce network traffic, but such storage creates other problems. For example, if one of the several nodes is also writing to the file, the client node reading the file may not be accessing the latest updated file that has just been written. As such, the file integrity is lost.

It is known to provide a distributed file system (DFS) to help alleviate the problems associated with accessing files across the network. In such systems, such as the DCE Distributed File System, a local cache exists at every node in the distributed network. Remote processes executing at a client node access a file on a server node in a two-step caching scheme. The server node gets blocks of the file from its disk and stores them in the server cache. If necessary, the client node goes out over the network and gets blocks of the file from the server cache and stores the blocks in the client cache. When the application of client node seeks data from any block of the file, the client cache is accessed instead of going across the network for each access. Using the client cache to access and store a remote file significantly improves performance because when frequently-referenced data is cached and is locally available referenced data is cached and is locally available when needed (a so-called "cache hit"), the application does not need to use file server resources. Network traffic is thereby decreased, allowing greater scalability of the network and reduction of overhead.

Although distributed file system implementations provide extensive caching of file data either to disk or memory at the client system, such systems lack policies that enforce equitable use of the cache among the file data in the cache. As a result, a single file's data may consume the entire cache, forcing out data from other files that could otherwise be frequently referenced. The problem is exacerbated when the application program requires file I/O that is not conducive to caching, such as when the application requires sequential I/O on a file that is larger than the entire cache itself. In this case, caching of the entire file causes all then-cached data to be flushed to make room for portions of the new file. The lack of fairness reduces the scalability and performance qualities of the distributed file system.

BRIEF SUMMARY OF THE INVENTION

It is therefore an object of the present invention to apply one or more "fair" caching policies in a distributed file system of a computer network to thereby encourage more equitable use of cache resources.

It is another object of the invention to allow for extensive yet equitable caching of file data either to disk or memory at a client system to thereby provide increased cache hits for frequently-referenced files.

It is still another object of the invention to provide a DFS client cache implementation that includes one or more fair policies or techniques that function to retain cachable data and reduce the cache usage of data that does not lend itself to caching.

A further object of the invention is also to provide increased client cache hit ratios, greater scalability and higher perfomrance on large file I/O in a distributed file system.

It is yet another object of the invention to implement one or more cache management technique(s) that enforce equitable use of the cache among the file data in the cache. One preferred technique is a timestamp handicapping routine that exploits the fact that, in many file sharing environments, reuse of data from small-to-medium sized files is very common. One portion of the handicapping routine functions to keep small-to-medium files in the cache. Another technique implements a "cache quota", which limits the percentage of the cache a single file may consume when there is other data on the cache. When caching of a single file approaches the cache quota, the file data is made to look older than it really is so that upon a subsequent file I/O operation, portions of such data are recycled from the cache earlier than they would have been otherwise. When caching of a single file reaches the cache quota, the file must begin reusing cache from itself, instead of cache supporting other files or data. The cache quota technique has the effect of causing cached data towards the end of large files to get flushed or recycled from the cache first. A third technique helps to detect file I/O that is not conducive to caching, such as sequential I/O on a file that is larger than the entire cache. In this case, the routine prevents the large file from stealing cache space used by other files by establishing a small, but dedicated area of cache in which portions of such large file may be stored if space permits. Those portions are recycled first when subsequent file I/O operations require cache space.

The techniques are implemented either singularly or in combination to enhance the cache management of file data in a distributed file system of a computer network.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

The present invention is directed generally to managing cached data in a client data processing system. Although the techniques are described in the context of a "client", it should be appreciated that the techniques are also useful on servers and, more generally, with respect to operating systems per se.

Figure 1:
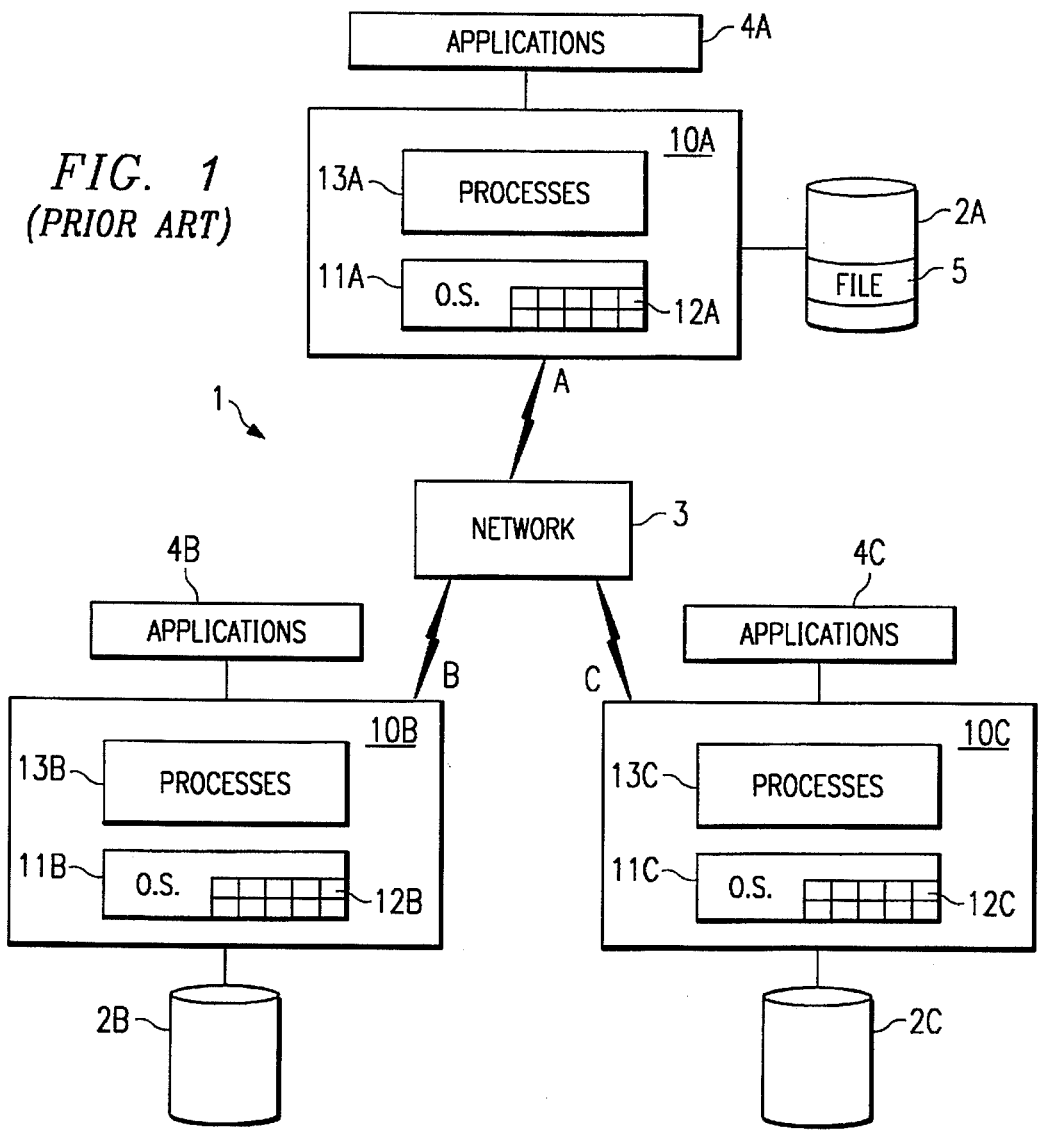
FIG. 1 illustrates a known computer network in which a distributed file system (DFS) is implemented.

It is known to implement a distributing computing environment in which users can access distributed resources and process applications on multiple computers. A known distributed computing environment (DCE) is illustrated in FIG. 1 and includes two or more nodes A, B and C connected through a communication link or network 3. The network 3 can be a local area network (LAN) or a wide area network (WAN), the latter comprising a switched or leased teleprocessing (TP) connection to other nodes or to a network of systems under IBM's Systems Network Architecture (SNA). At any of the nodes A, B or C there may be a processing system 10A, 10B or 10C. Each of these systems may be a single user system or a multi-user system. For example, each processing system may be an IBM® RT® PC or RISC System/6000® (a reduced instruction set or so-called RISC-based workstation) running the AIX™ (Advanced Interactive Executive) operating system. The AIX operating system is compatible at the application interface level with AT&T's UNIX operating system, version 5.2. The various models of the RISC-based personal computers are described in many publications of the IBM Corporation, for example, *RISC System/6000, 7073 and 7016 POWERstation and POWERserver Hardware Technical Reference, Order No. SA23-2644-00*. The AIX operating system is described in *AIX Operating System Technical Reference*, published by IBM Corporation, First Edition (November, 1985), and other publications. A detailed description of the design of the UNIX operating system is found in a book by Maurice J. Bach, *Design of the Unix Operating System*, published by Prentice-Hall (1986).

In a particular implementation, not meant to be limiting, the network of FIG. 1 is a plurality of IBM RISC System/6000 workstations interconnected by IBM's System Network Architecture (SNA), and more specifically SNA LU 6.2 Advanced Program to Program Communication (APPC). SNA uses Ethernet (a local area network developed by Xerox Corporation) as its link level, but other architectures, such as token ring, are likewise useful to implement the network of FIG. 1. A simplified description of local area networks may be found in a book by Larry E. Jordan and Bruce Churchill entitled *Communications and Networking for the IBM PC*, published by Robert J. Brady (a Prentice-Hall Company) (1983). Although the present invention is later described in the above-identified network context, it should be appreciated that the teachings herein may be implemented using other and different computers than the IBM RISC-based PC's interconnected by other networks architectures. Thus, for example, the invention may be implemented in IBM's PS/2® line of computers running under the OS/2® operating system. For more information on the PS/2 line of computers and the OS/2 operating system, the reader is directed to *Technical Reference Manual Personal Systems/2 Model 50, 60 Systems IBM Corporation*, Part No. 68x2224 Order Number S68X-2224 and *OS/2 2.0 Technical Library, Programming Guide Volumes 1-3 Version 2.00*, Order Nos. 10G6261, 10G6495 and 10G6494.

Returning now back to FIG. 1, each of the processing systems 10 may operate as a "client" or "server," depending on whether it is requesting or supplying services. Each of these systems may be a single user system or a multi-user system with the ability to use the network 3 to access files located at a remote node in the network. To implement such distributed file services, a local cache 12A, 12B and 12C exists at every node A, B and C. Preferably the local cache is configured on disk or memory and is adapted to retain data and files that are frequently referenced by the resident applications. For example, if file 5 permanently resides at node A on disk 2A, use of the cache 12A by local processes 13A is carried out locally. However, remote processes 13B and 13C executing at nodes B and C, respectively, access file 5 through a two step caching scheme using a server cache and a client cache. The server node gets blocks of file 5 from disk 2A and stores them in the server cache 12A. Client node B goes out over the network end gets blocks of file 5 from the server cache 12A. Client node B stores the blocks of file 5 as it existed in the server cache 12A into the client cache 12B. When the user address space 14B of client B seeks data from any block of file 5, the client cache 12B is accessed instead of going across the network 3 for each access. Using the client cache 12B to access a remote file 5 can significantly improve the performance since it can reduce network traffic and overhead.

Every file input/output (I/O) operation goes through the cache. These operations include read operations, where the application desires to read data from a file somewhere in the network, and write operations, where the application desires to write data to a file somewhere in the network. If an application desires to read data, the operating system opens a file and calls a read data function. The function indicates the file from which the data is to be read, the number of bytes to be read starting from some offset, and the address in the address space of the client OS where the data read is to be stored. The read request is then provided to the distributed file system (DFS).

The DFS first determines whether there is an available "chunk", representing some space in the cache, for the range of data defined by the read request. As seen in FIG. 1, each cache of a client processing system is organized into fixed or variable sized blocks or "chunks." In a representative system, the cache is 10 Mbytes in length and each chunk may contain as much as 64 Kbytes, and thus the cache is organized into approximately n chunks, where if each chunk holds maximum data, approximately 156 chunks can be concurrently active. Of course, the particular size of the cache or each chunk is configurable. Each chunk has associated therewith a timestamp indicating when data in the chunk was last used by the client processing system, and a chunk is either allocated to a range of data for some file or it is considered to be "unused." If the DFS determines that there is not an existing chunk representing the range of data defined by the read request, it manufactures one by taking a chunk from a list of unused chunks, if any exist, or, if no unused chunks exist, by calling a "least recently used" (LRU) routine to recycle used chunks onto the unused list. As its name implies, the LRU function flushes from the cache data in the chunk(s) least recently used to make room for new data. The oldest used chunk is then recycled into an unused chunk (by flushing the data) and placed on the unused chunk list. Seizing the unused chunk, the DFS executes the read request by issuing a remote procedure call (RPC) to the server, fetching the data, storing the data in the chunk and writing the fetched data to the application's designated address space.

Alternatively, if the DFS determines that there is an existing chunk representing that range of data defined by the read request, it need not manufacture one. The DFS then simply determines whether the data already present in the chunk is still valid. If so, the data is copied from the chunk and put in the designated address space. If the DFS determines that the data is not valid, an RPC is carried out to fetch the "valid" data from the server. The data is then put in the chunk and in the address space to complete the read request.

In response to a write request, the DFS likewise determines whether there is an available chunk for the range of data defined by the write request. If the DFS determines that there is not an existing chunk representing that range of data defined by the write request, it manufactures one by taking a chunk from the list of unused chunks, if any exist, or, if no unused chunks exist, by calling the LRU routine to recycle used chunks onto the unused list. With an unused chunk in hand, the DFS first executes the write request by placing the data in the chunk and issuing the RPC to the server. If the DFS determines that there is an existing chunk representing that range of data defined by the write request, it need not manufacture one. But the DFS still must determine whether data (already in the cache) is valid in its then-cached state. If so, the data modifications are applied to the chunk and provided to the server. If the data in the chunk is not valid, the read operation must be carried out first to "clean up" the file. A read operation such as defined above is used for this purpose. After the chunk has been updated to reflect the valid data, the write operation is completed by copying the new data into the chunk and providing it to the server.

With the above discussion by way of background, the present invention can now be described. The present invention enhances known DFS client caching implementations by incorporating several "fair" caching policies and procedures, referred to herein as timestamp "handicapping", a "cache quota," and the creation and use of an "old chunk" list (or dead queue) where sequential I/O of large files relative to the cache size is involved. Timestamp handicapping refers to the modification of a chunk's timestamp to alter when the chunk is available for recycling by the DFS. A cache quota Q refers to a (configurable) percentage of the cache that a single file's data may consume when there is other data on the cache. According to the invention, as this percentage is being approached during the cache process, chunks receiving additional portions of the particular file are made to appear older than they really are (through use of the handicapping function). When the cache quota is reached, the file must begin re-using cache from itself or from handicapped chunks from other files. The cache quota technique has the effect of causing cached data towards the end of large files to get flushed or recycled from the cache first when subsequent I/O operations are looking for cache space. The third technique involves allocating a small, but dedicated portion of the cache to receive chunks that will not even be considered for LRU evaluation when subsequent I/O operations require cache space, but instead are recycled first.

As used herein, "fair" caching refers to one or more of these techniques to thereby encourage equitable use of cache resources. The techniques, singularly or in any combination, work to retain "cachable" data in the cache and to reduce the cache usage of data that does not lend itself to caching. The policies insure that a single file's data does not consume a majority or all of the entire cache, forcing out data from other files which could be frequently referenced.

The invention may be implemented as a standalone utility, as part of the client operating system, as part of the LAN network operating system (NOS), downloaded as a file from a remote system or in any other conventional manner.

According to the invention, a method of enhancing cache management in a client processing system is provided where the cache is divided into "chunks", each of which has associated therewith a timestamp. The underlying policy used to improve the "fairness" of the caching process is referred to herein as timestamp "handicapping." This policy is implemented by the Chunk LRU Timestamp Handicapping Function illustrated in FIG. 2. As will be seen below, the handicapping function is carried out at different decision points throughout the inventive method and with different variables, thereby creating differing "degrees" of either positive or negative handicapping. Positive handicapping refers to modifying a chunk's timestamp to make it appear that the chunk was used more recently than is actually the case. Negative handicapping refers to modifying a chunk's timestamp to make it appear that the chunk is older than is actually the case. Given the LRU function, the "older" the chunk's timestamp, the sooner it will be recycled when cache space is needed.

To this end, the function takes as inputs a chunk descriptor containing a chunk number "c_num", and a desired "severity" level "s". The severity level is a predetermined overall range (e.g., 0–10) where for convenience 0 is said to represent a severity, numbers in the range 1–7 represent "medium" severity and numbers in the range of 8–10 represent "high" severity. Of course, the particular range and the subrange limitations are merely exemplary and are configurable. The severity level varies depending on particular decision paths of the management techniques, as will be seen below. When the severity level is "low", a small amount of handicapping is applied to a timestamp, but in a positive manner. When the severity level is in the range of "medium", a relatively larger degree of handicapping is applied to the timestamp, but in a negative manner. And, when the severity level is in the high range, an even larger degree of negative handicapping is applied.

The general operation of the handicapping function of FIG. 2 can be summarized as follows. When the severity level is set at low, a "low" handicap is applied. In the preferred embodiment of the invention, this function simply serves to handicap the first few chunks in the particular file in a positive manner (by making the data in the chunks appear to have been more recently used that they actually were). The timestamps of the chunks beyond the first few are left alone. This policy exploits that in many environments, greater cache hit ratios are obtainable when the beginning of files are kept in cache, whether or not higher-order portions of the files are also kept. "Low" severity handicapping (in a positive sense) achieves this result.

If the severity level is moderate but not high, a medium (but negative) handicap (which is influenced by the severity level as will be seen) is applied to the chunk. As will be discussed below, medium handicaps are typically applied during a read operation when, during caching, a file is being read sequentially, the whole chunk has been accessed and the file is approaching (but not exceeding) a per file cache quota Q. Such a handicap is typically applied in a write operation in one of two ways. If the data has yet to be sent to the server, medium handicaps are applied to the chunk when data being cached is at a position in the file greater than the cache quota Q. Alternatively, if the data has already been sent to the server, a medium handicap is applied when data being cached is at a position in the file a major portion (e.g., between 50–75%) of the way to the cache quota.

If the severity level is high, a "large" (also negative) handicap (influenced by the chunk number) is applied to the chunk. As will be discussed below, large handicaps are preferably used during write operations when data has already been sent to the server and the data being cached is at a position in the file approaching the cache quota (greater than a configurable percentage, such as 75% of Q). It is also desirable to apply a large handicap to a chunk when the chunk is one that could be placed on the dead queue but cannot be because the queue is filled.

Figure 2:
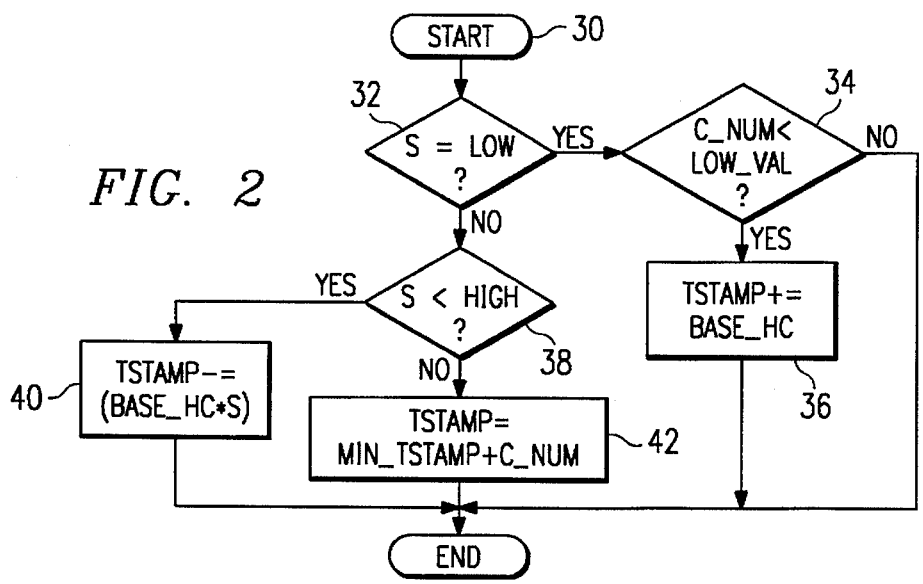
FIG. 2 illustrates a handicapping function of the present invention that is used to modify or alter chunk timestamps either positively or negatively and by varying degrees of severity.

With reference now to FIG. 2, the detailed operation of the handicapping routine is described. The handicapping function begins at step 30. At step 32, a test is made to determine whether the severity level is low. This test is done initially for computational efficiency because, as will be described below, the handicapping function is called each time a DFS read or write operation has to go out and reference a chunk. Each time a chunk is obtained by the DFS, the severity level for that chunk is set "low", therefore it is desirable to begin the handicapping function at step 32. If the result of the test at step 32 is positive, a test 34 is done to determine whether the chunk number "c num" is less than a threshold low value "low_val". The threshold low value is tunable and, in one implementation is set to "2" so that only the lowest order chunk numbers 0, 1 and 2 are handicapped in a positive manner. If the outcome of the test at step 34 is positive, the function handicaps the timestamp of the chunk identified by the chunk number (i.e., chunk number 0, 1 or 2) at step 36 by adding a base handicap increment (also configurable) to the chunk's timestamp "tstamp" to generate a new "tstamp" value. This step handicaps the chunk in the positive sense in that by "advancing" the timestamp value (potentially into the future), the chunk will be available to be flushed from the cache later than it would have been otherwise without the handicapping. If the result of the test at step 34 is negative, the function skips step 36 and ends. This completes the low severity handicapping.

If the outcome of the test at step 32 is negative, then the severity level is not low. The routine then performs a test at step 38 to determine if the severity level is less than high. If so, medium handicapping is required and the routine branches off to the left as shown in the figure. At step 40, the timestamp of the chunk is negatively-handicapped by subtracting from the chunk's timestamp a value "base_hc * s" where s is the severity level between 1 and 7 in this particular implementation. After step 40, the routine ends as to this particular chunk. This completes the medium severity handicapping.

If the outcome of the test at step 38 is negative, then the severity level is necessarily high. Thus, at step 42, the timestamp of the chunk is set to a value "min_tstamp+c_num", where min_tstamp is the oldest possible time stamp that can be assigned to the chunk number. Biasing the oldest value with the "c_num" insures that a sequence of chunks retains some byte order. After step 42, the routine ends.

Therefore, one technique for providing fair caching involves handicapping or "altering" a chunk's timestamp either positively or negatively such that when the DFS needs to obtain cache space, affected chunk(s) are made to appear "younger" or "older", respectively, than they would be otherwise.

Another technique, the cache quota, supplements and uses handicapping (but only in a negative sense) to cause file data at large offsets in the file to be recycled faster than they would be otherwise.

The third techique involves establishing a small, but dedicated area of the cache as a "dead queue" for storing chunks of large data files. Chunks in the dead queue are recycled first without incurring the expense of LRU evaluation for the remaining chunks in the cache. The dead queue techique is typically used when sequential I/O is being done on a file that is larger than the entire cache. When the situation is detected (and when the cache quota is exceeded), subsequent portions of the file are placed in chunks in the dead queue. This operation has the effect of compressing the caching footprint used by the file down to a small number of cache blocks. The dead queue is preferably a small (less than 10 chunks) but dedicated area of the cache that is allocated to receive chunks from files that cannot be fully supported on the cache because of their size. By dedicating a portion of the cache for this purpose, more efficient recycling is achieved because chunks added to the dead queue are not handled by the LRU routine.

Figure 3:
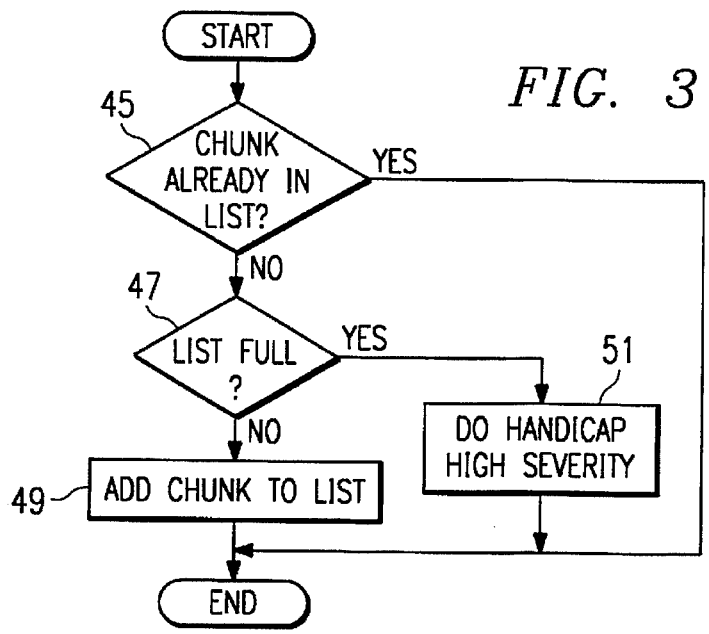
FIG. 3 illustrates an old chunk list add function that is used to either add chunks from large data files into a dead queue or to severely handicap the timestamps of those chunks.

An old chunk add list function is shown in FIG. 3. At step 45, a test is done to determine whether a particular chunk (i.e., the data from a large file) is already on the queue. If so, the routine ends. If the chunk is not already in the dead queue, a test is made at step 47 to determine if the dead queue list is already filled with chunks. If the outcome of the test at step 47 is negative, the chunk (with the data) is added to the list at step 49. If the dead queue is full, however, the severity level for the chunk is set "high" and the middle branch of the handicapping function of FIG. 2 is then carried out as indicated at step 51.

Figure 4:
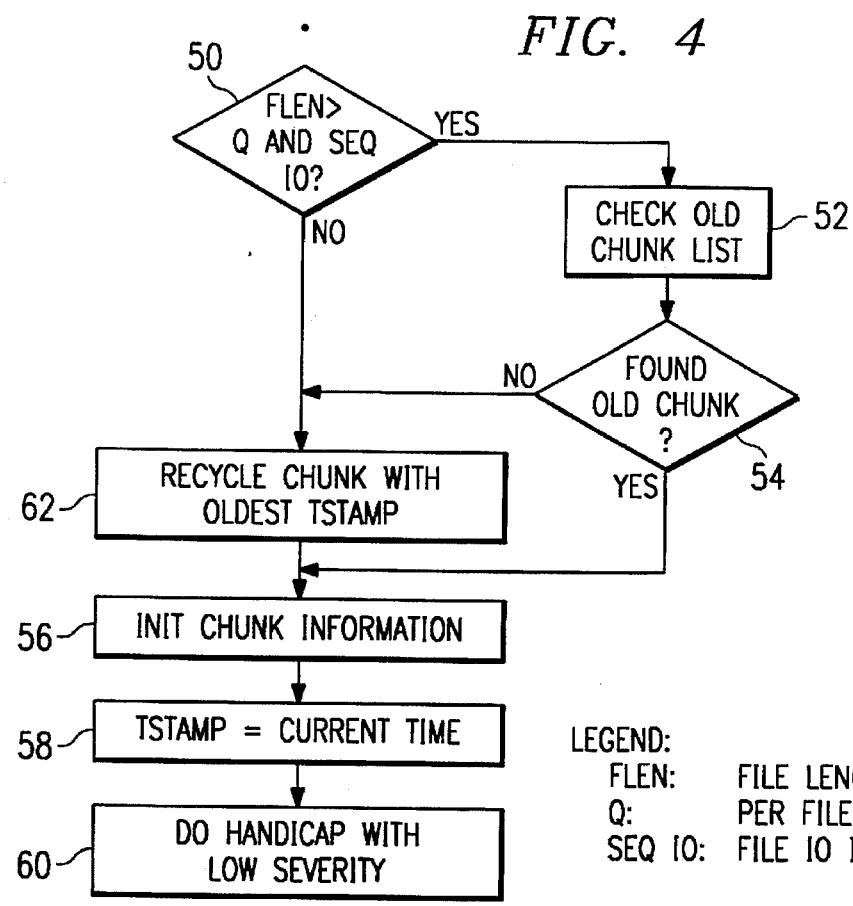
FIG. 4 illustrates a GetChunk function that it used by the distributed file system (DFS) to locate and identify a chunk that is to be used in a file I/O operation when no unused chunks are available.

Turning now to FIG. 4, a flowchart is shown of a GetChunk routine which, as noted above, is used by the cache manager each time it becomes necessary to obtain a chunk for use to handle a file I/O operation. The GetChunk function (not shown in full) uses all three "fairness" techniques. At step 50, a test is performed to determine if the file length "flen" is greater than the per file cache quota Q and the I/O history demonstrates a "sequential" nature. If the outcome of the test at step 50 is positive, the routine branches to step 52 at which the "old chunk list" or dead queue is checked to quickly obtain a chunk. A test is then made at step 54 to determine whether a corresponding "old chunk" has been found in the dead queue. If so, the routine returns to its main path (skipping the LRU function) and will use that chunk to receive data. If necessary, the chunk would first be emptied of data. At step 56, the routine initializes the "chunk" information and the data is stored. Timestamp for the chunk is then set to the current time in step 58. The routine ends at step 60 by calling the handicapping function with low severity (such that the outcome of the test 32 in FIG. 1 will be positive).

If the outcome of the initial step 50 is negative, or if the outcome of the test at step 54 is negative, then at step 62 the routine recycles the chunk with the oldest timestamp. Step 62 is the LRU function. The chunk information is then initialized at step 56, timestamped at step 58 and handicapped with low severity at step 60.

Figure 5:
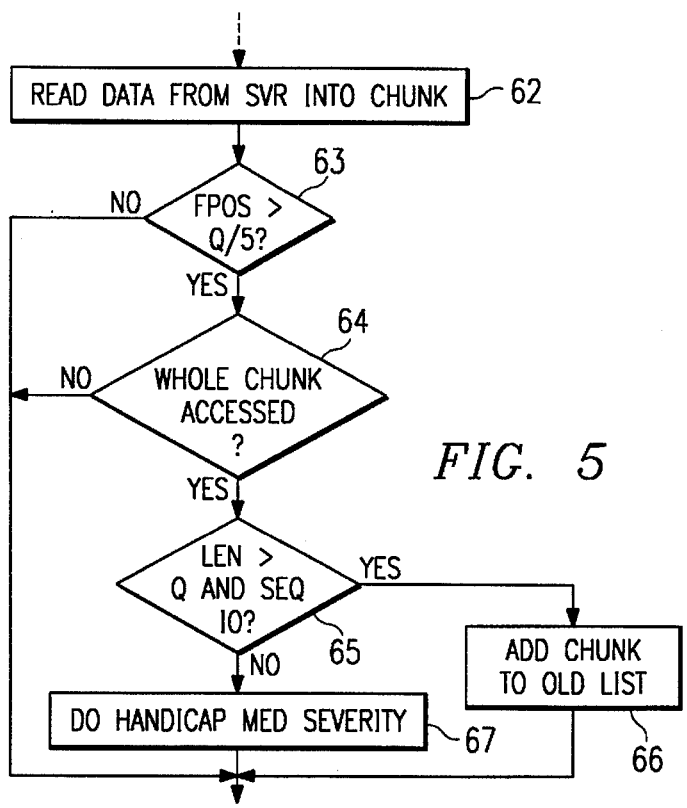
FIG. 5 illustrates a portion of a Read file operation according to the present invention.

Referring now to FIG. 5, a portion of the Read path operation is shown in accordance with the invention. This routine is called after GetChunk obtains a chunk and a test is performed to determine whether data to be read is still valid. If so, the routine begins at step 62 to read data from the server into the chunk. At step 63, a test is made to determine whether the position in the file being read (i.e., the offset) is greater than about 20% of the cache quota Q. This percentage is configurable. If the outcome of the test at step 63 is negative, the routine ends. If the outcome of the test at step 63 is positive, however, a potentially large file is being accessed, thus possibly requiring negative handicapping. Therefore, a test is performed at step 64 to determine whether the whole chunk has been accessed. If not, the routine ends. If the outcome of the test at step 64 is positive, then sequential I/O of a large file is very likely to be taking place. A test is then performed at step 65 to determine whether the file length is larger than the cache quota Q for a file being read sequentially. If so, chunks at offsets larger than the cache quota are added at step 66 to the dead queue (by the function in FIG. 3). If the outcome of the test at step 65 is negative, the routine assigns a medium severity level "s" and, at step 67, calls the handicapping function (of FIG. 2).

Figure 6:
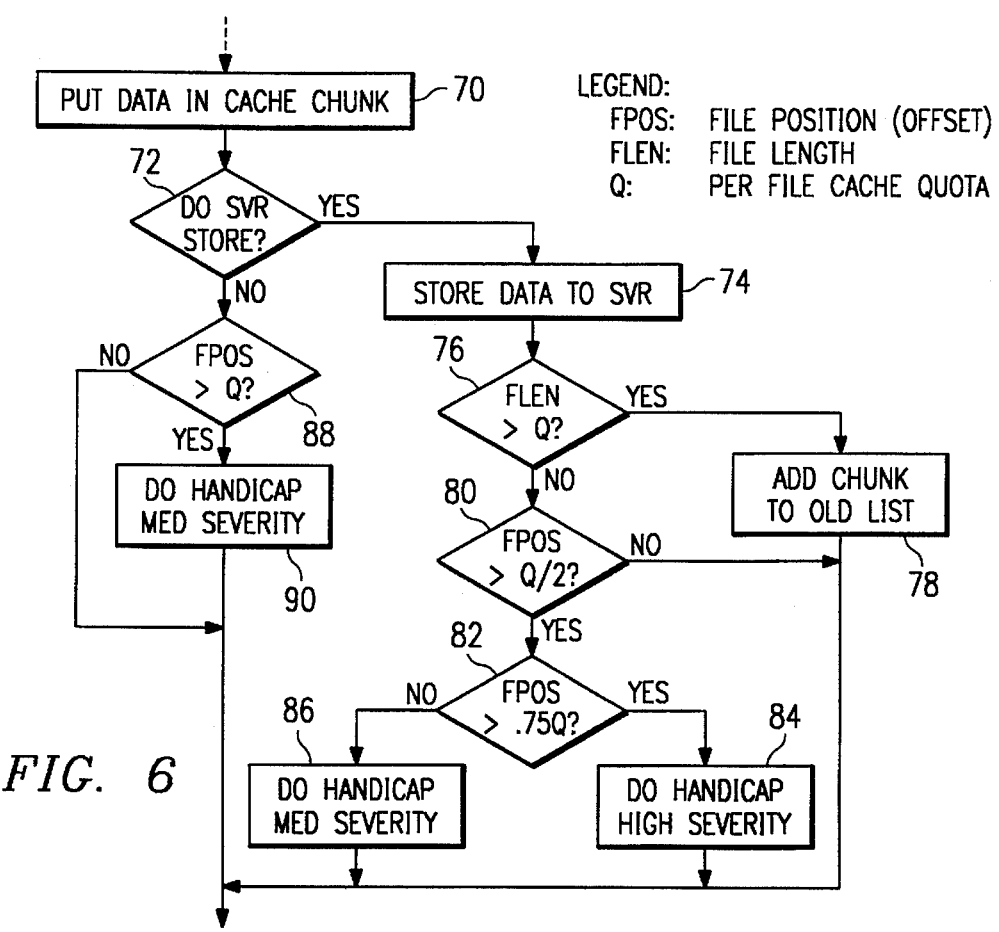
FIG. 6 illustrates a portion of a Write file operation according to the invention.

Referring now to FIG. 6, a portion of the Write operation is shown in accordance with the present invention. This portion is run after GetChunk obtains a chunk and valid data has been obtained for the write operation. At step 70, data is put into a cache chunk. A test is then made at step 72 to determine whether the data is to be stored on the server. If the outcome of the test at step 72 is positive, the data is stored on the server at step 74. A test is then performed at step 76 to determine whether the file length "flen" is greater than the per file cache quota Q. If so, the chunk is added to the dead queue at step 78 (by the routine of FIG. 3) and the routine ends. If the file length is not greater than the per file cache quota Q, a second test is performed at step 80 to determine whether the file is starting to consume more than a predetermined (configurable) amount of the cache quota, for example 50% of the cache quota. If the outcome of the test of step 80 is negative, the routine ends. However, if the outcome of the test at step 80 is positive, another test 82 is performed to determined whether the file position has then exceeded an even higher percentage of the cache quota Q, which in this embodiment is preset for 75% of the cache size (but which is also configurable). If the outcome of the test 82 is positive, a handicap with high severity is implemented at step 84; otherwise, a medium handicap is implemented at step 86. Afterwards, the routine ends.

Alternatively, if the result of the test at step 72 is negative, a test is performed at step 88 to determine whether the file offset position is greater than the cache quota Q. If not, the routine terminates. If so, however, the routine performs a handicap with medium severity at step 90 and the routine terminates.

One of the preferred implementations of the present invention is as a set of instructions in a code module resident in the random access memory of the personal computer or workstation. Until required by the computer system, the set of instructions may be stored in another computer memory, for example, in a hard disk drive, or in a removable memory such as an optical disk (for eventual use in a CD ROM) or floppy disk (for eventual use in a floppy disk drive).

Although in the preferred embodiment the handicapping or "biasing" function is carried out on chunk timestamps, it should be appreciated that this feature may also be implemented using other forms of chunk recycling techniques. Thus, in a more general sense, a timestamp is just one of many different types of "metrics" which are useful in a selection process to determine which chunks should be recycled when cache space is required. For example, in a time-based selection process such as the LRU, the metric is the timestamp. Other forms of metrics are priority ordering, FIFO (first in first out), NFU (not frequently used), a class-based (e.g., low, medium and high) scheme, a time-based scheme relying on criteria other than LRU, or other set selection techniques.

While the invention has been described in terms of a preferred embodiment in a specific operating system and network environment, those skilled in the art will recognize that the invention can be practiced, with modification, in other and different operating systems and network architectures with the spirit and scope of the appended claims.

Having thus described the invention, what I claim as new and desire to secure by Letters Patent is set forth in the following claims.

What is claimed is:

1. A method of managing a cache of a processing system connected to a computer network during a file I/O operation in which data from a file is being accessed, the cache being divided into chunks, the method comprising the steps of:
   (a) determining whether the file I/O operation is of a predetermined type;
   (b) if the file I/O operation is of the predetermined type, determining whether data being accessed from the file is at a predetermined offset in the file;
   (c) if the data being accessed is not at the predetermined offset in the file, storing the data being accessed in one or more chunks of the cache not currently in use by the file during the file I/O operation; and
   (d) if the data being accessed is at the predetermined offset in the file, storing the data being accessed in one or more chunks of the cache already in use by the file during the file I/O operation.

2. The method as described in claim 1 wherein the predetermined type of file I/O operation is a sequential access.

3. The method as described in claim 2 wherein the predetermined offset is a given percentage of a per file cache quota.

4. The method as described in claim 3 wherein the per file cache quota is selectable.

5. A method of managing a cache of a processing system connected in a distributed computer network environment during a file I/O operation, the cache being divided into chunks, the method comprising the steps of:
   (a) during a file I/O operation in which data from a file is being accessed, determining whether the file I/O operation is of a predetermined type;
   (b) if the file I/O operation is of the predetermined type, determining whether data being accessed from the file is at a predetermined offset in the file;
   (c) if the data being accessed is not at the predetermined offset in the file, storing the data being accessed in one or more chunks of the cache not currently in use by the file during the file I/O operation;
   (d) if the data being accessed is at the predetermined offset in the file, storing the data being accessed in one or more chunks of the cache already in use by the file during the file I/O operation; and
   (e) after the file I/O operation is complete altering timestamps of the one or more chunks of the cache identified in step (c) such that during a subsequent file operation data in said one or more chunks will appear to have been accessed from the cache more recently.

6. The method as described in claim 5 wherein the predetermined offset is a given percentage of a per file cache quota.

7. A method of managing a cache of a processing system connected to a computer network during a file I/O operation in which data from a file is being accessed, the cache being divided into chunks, the method comprising the steps of:
- (a) determining whether the file I/O operation for the file is of a predetermined type, whether the file has a length greater than a predetermined value, and whether data being accessed from the file is at a predetermined offset in the file;
- (b) if one or more conditions identified in step (a) are not met, storing the data being accessed in one or more chunks of the cache not currently in use by the file during the file I/O operation; and
- (c) if the conditions identified in step (a) are met, storing the data being accessed in one or more chunks of the cache already in use by the file during the file I/O operation.

8. The method as described in claim 7 wherein the predetermined type is a sequential file access and the predetermined value is a cache quota representing a given percentage of the cache a single file's data may consume when there is other data in the cache.

9. A method of managing a cache of a processing system connected to a computer network during a file I/O operation in which data from a file is being accessed, the cache being divided into chunks and having a cache quota Q associated therewith identifying a percentage of the cache a single file's data may consume when there is other data in the cache, the method comprising the steps of:
- (a) determining whether the file I/O operation is of a predetermined type, whether the file has a length greater than the cache quota and whether data being accessed from the file is at a predetermined offset in the file;
- (b) if one or more conditions identified in step (a) are not met, storing the data being accessed in one or more chunks of the cache not currently in use by the file during the file I/O operation; and
- (c) if all of the conditions identified in step (a) are met, recycling chunks currently in use by the file during the file I/O operation and storing the data being accessed in the recycled chunks.

10. A program storage device readable by a processor and tangibly embodying a program of instructions executable by the processor to perform a method of managing a cache of a client processing system during a file I/O operation in which data from a file is being accessed, the cache being divided into chunks, the method comprising the steps of:
- (a) determining whether the file I/O operation is of a predetermined type, whether the file has a length greater than a per file cache quota, and whether data being accessed from the file is at a predetermined offset in the file;
- (b) if one or more conditions identified in step (a) are not met, storing the data being accessed in one or more chunks of the cache not currently in use by the file during the file I/O operation; and
- (c) if all of the conditions identified in step (a) are met, recycling chunks currently in use by the file during the file I/O operation and storing the data being accessed in the recycled chunks.

11. A computer for use in a distributed computing environment, comprising:
- a processor;
- a memory having a cache, the cache being divided into chunks; and
- a cache management means comprising:
  - means, operative during a file I/O operation in which data from a file is being accessed, for determining whether the file I/O operation is of a predetermined type;
  - means, responsive to a determination that the file I/O operation is of the predetermined type, for determining whether data being accessed from the file is at a predetermined offset in the file;
  - means, responsive to a determination that the data being accessed is at the predetermined offset in the file, for storing the data being accessed in one or more chunks of the cache already in use by the file during the file I/O operation; and
  - least recently used (LRU) biasing means for altering timestamps of one or more chunks of the cache to influence an outcome of a time-based evaluation during a subsequent file I/O operation.

12. In a computer system providing a distributed computing environment in which users can access distributed resources and process applications, the computer system including a computer connected to a local area network, the computer comprising:
- a processor;
- a memory having a cache, the cache being divided into chunks; and
- a cache management means comprising:
  - means, operative during a file I/O operation in which data from a file is being accessed, for determining whether the file I/O operation is of a predetermined type;
  - means, responsive to a determination that the file I/O operation is of the predetermined type, for determining whether data being accessed from the file is at a predetermined offset in the file;
  - means, responsive to a determination that the data being accessed is at the predetermined offset in the file, for storing the data being accessed in one or more chunks of the cache already in use by the file during the file I/O operation; and
  - means for altering a given metric of one or more chunks in the cache to influence an outcome of a selection process during a subsequent file I/O operation.

* * * * *